(12) United States Patent
Mori et al.

(10) Patent No.: US 7,077,023 B2
(45) Date of Patent: Jul. 18, 2006

(54) TOROIDAL CONTINUOUSLY VARIABLE TRANSMISSION

(75) Inventors: Haruhito Mori, Yokohama (JP); Jun Sugihara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 512 days.

(21) Appl. No.: 10/644,959

(22) Filed: Aug. 21, 2003

(65) Prior Publication Data

US 2004/0087412 A1    May 6, 2004

Related U.S. Application Data

(63) Continuation-in-part of application No. 10/057,966, filed on Jan. 29, 2002, now abandoned.

(30) Foreign Application Priority Data

Feb. 13, 2001    (JP) ............................. 2001-035535

(51) Int. Cl.
   *F16H 15/38*    (2006.01)
(52) U.S. Cl. .................. 74/46; 74/40; 74/41; 74/42
(58) Field of Classification Search .................. 74/40, 74/41, 42, 46, 1, 10, 70
   See application file for complete search history.

(56) References Cited

U.S. PATENT DOCUMENTS 6,083,137 A * 7/2000 Kato et al. ..................... 476/8
6,328,669 B1 * 12/2001 Imanishi et al. ............... 476/72
6,368,245 B1 * 4/2002 Goto et al. .................... 476/46
6,749,343 B1 * 6/2004 Kato et al. ................... 384/614
2002/0019289 A1 * 2/2002 Ishikawa ...................... 476/46
2002/0111247 A1   8/2002 Mori et al.
2003/0104898 A1 * 6/2003 Mori ............................ 476/46
2004/0018911 A1 * 1/2004 Nishii et al. .................. 476/40

FOREIGN PATENT DOCUMENTS

| JP | 7-198014 A | 8/1995 |
|---|---|---|
| JP | 8-240252 A | 9/1996 |
| JP | 2001-12574 A | 1/2001 |
| JP | 2001-165265 A | 6/2001 |
| WO | WO 01/42684 A1 | 6/2001 |

* cited by examiner

*Primary Examiner*—David Fenstermacher
(74) *Attorney, Agent, or Firm*—Foley & Lardner LLP (57) ABSTRACT

In a toroidal continuously variable transmission, a roller-and-cage bearing assembly is interleaved between a power-roller outer ring and a trunnion power-roller accommodating portion to permit a parallel translation of a power roller in an axial direction of input and output disks. A cage of the roller-and-cage bearing assembly is formed with an oval slotted hole. A disk-shaped member is attached to the trunnion power-roller accommodating portion. The slotted hole and the disk-shaped member are fitted to each other to define a predetermined clearance that limits a displacement of the roller-and-cage bearing assembly in a direction perpendicular to both a rotation axis of the power roller and a trunnion axis to a set displacement.

9 Claims, 4 Drawing Sheets

FIG.4B

TOROIDAL CONTINUOUSLY VARIABLE TRANSMISSION

REFERENCE TO RELATED APPLICATIONS

This application is a continuation-in-part of application Ser. No. 10/057,966, filed Jan. 29, 2002, now abandoned, the content of which is incorporated herein in its entirety.

FIELD OF THE INVENTION

The present invention relates to a toroidal continuously variable transmission, and specifically to a support for a power roller interposed between input and output disks of a toroidal continuously variable transmission.

DESCRIPTION OF THE RELATED ART

In recent years, to meet demands for increased shift comfort, improved driveability, and reduced fuel consumption and exhaust emissions, there have been proposed and developed various continuously variable transmissions, such as a segmented metal belt-drive continuously variable transmission and a toroidal continuously variable transmission often abbreviated to "toroidal CVT", in which a transmission ratio is steplessly variable within limits. Toroidal CVTs in which engine power (torque) is transmitted from an input disk to an output disk via a traction oil film formed between a power roller and each of the input and output disks, using a shearing force in the traction oil film at high contact pressure, are superior to belt-drive CVTs, in a higher torque capacity, and faster transmission-ratio changes. Such toroidal CVTs went into mass production. Toroidal CVTs are generally classified into a full-toroidal CVT and a half-toroidal CVT. From the viewpoint of reduced spin loss, the half-toroidal CVT model is superior to the full-toroidal CVT model. The half-toroidal CVT has a power roller interposed between input and output disks and being in contact with a torus surface of each of the input and output disks under preload, and a trunnion serving as a power roller support. During transmission-ratio changing, in order to obtain a desired transmission ratio determined based on the magnitude of a gyration angle of the power roller, first of all, the power roller is offset from the center of rotation of the disks by slightly shifting the trunnion in a direction of a trunnion axis perpendicular to a rotation axis of the power roller. By virtue of a side slip force occurring in a very limited contact zone between the power roller and the input and output disks due to the slight offset (the slight vertical displacement), the power roller is tilted or inclined. When the gyration angle corresponding to the desired transmission ratio has been reached, the vertical displacement of the trunnion is returned to zero, so as to stop the inclining motion of power roller. During ratio changing with inclining motion of the power roller, to keep the power roller and the respective disk in contact with each other, the input disk is forced axially against the output disk by means of a loading cam device. Generally, the output disk is axially stationary, whereas the input disk is axially moveable. On the other hand, a trunnion rod itself is not moveable in the axial direction of the disks. To keep the power roller and the respective disk in contact with each other regardless of changes in a relative distance of the input disk to the output disk under axial preload of the loading cam device, the power roller itself has to be shifted in the axial direction of the disks. Owing to deformation of the input and output disks during power transmission, or in presence of a slight misalignment after installation, there is a slight error in relative position between the power roller and the respective disk. To absorb such a slight error, in the same manner as the axial preload of the loading cam device, it is necessary to create a displacement of the power roller in the axial direction of the disks, that is, a horizontal displacement of the power roller. As a power-roller support that permits the horizontal displacement of the power roller, an eccentric pivot whose axis is eccentric to the rotation axis of the power roller is often used. In this case, oscillating motion of the eccentric pivot causes the horizontal displacement of the power roller. At the same time, the oscillating motion of the eccentric pivot also causes an undesirable vertical displacement of the power roller. Thus, the undesirable vertical displacement results in a slight offset of the power roller from the center of rotation of the disks. This causes undesirable transmission-ratio changing.

To avoid this, Japanese Patent Provisional Publication No. 7-198014 teaches the use of a linear bearing that is disposed between an inner peripheral wall of a power roller accommodating portion of a trunnion and a power roller, in such a manner as to permit parallel translation of the power roller in the right-and-left direction (horizontal direction) relative to the trunnion by means of the linear bearing. During power transmission, slight errors in relative position between the power roller and the respective disk repeatedly occur owing to deformation of the input and output disks, thereby resulting in reciprocating motion of the linear bearing itself in the axial direction of the disks. A horizontal displacement of the linear bearing obtained when the power roller pushes the linear bearing is somewhat different from that obtained when an external force applied to the power roller is released. After the reciprocating motion, there is an increased tendency that the linear bearing does not return to its initial set position. Due to the reciprocating motion of the linear bearing, arising from the parallel translation of the power roller, and undesired slight misalignment after assembling, there is an increased tendency for the linear bearing to be excessively protruded out of the trunnion power-roller accommodating portion. In the presence of the excessive protrusion of the linear bearing out of the trunnion power-roller accommodating portion, in other words, an excessive offset of the linear bearing from the initial set position, it is impossible to adequately support or bear the load acting on the power roller. Owing to the excessive offset of the linear bearing from the initial set position, there is a possibility for the linear bearing to be brought into contact with either the input disk or the output disk.

To avoid this, Japanese Patent Provisional Publication No. 2001-165265 teaches the use of a stopper for a roller-and-cage bearing assembly (substantially corresponding to the linear bearing discussed above) for the purpose of limitation on horizontal displacement of the roller-and-cage bearing assembly relative to a trunnion. The stopper is comprised of two parts, namely a protruded stopper portion and a grooved stopper portion. The protruded stopper portion is provided on the inner peripheral wall of the trunnion power-roller accommodating portion. This causes increased man-hour and manufacturing costs.

SUMMARY OF THE INVENTION

In one aspect, the present invention provides a toroidal continuously variable transmission having a simple and inexpensive power roller support structure, which is capable of properly restricting or limiting a horizontal displacement of a roller-and-cage bearing assembly relative to a trunnion power-roller accommodating portion, realizing low manufacturing costs, and of reliably supporting the load acting on the power roller, and of certainly preventing the roller-and-cage bearing assembly to be brought into contact with either an input disk or an output disk during power transmission.

In another aspect, the present invention provides a toroidal continuously variable transmission that includes input and output disks coaxially arranged and opposing each other, a power roller interposed between the input and output disks under axial preload; the power roller comprising a power-roller inner ring kept in contact with the input and output disks, a power-roller outer ring receiving a contact pressure transferred from the input and output disks to the power-roller inner ring under the axial preload, and a power-roller bearing interleaved between the power-roller inner and outer rings, a power-roller support comprising a trunnion having a power-roller accommodating portion that supports the power roller to permit a tilting motion of the power roller about a trunnion axis perpendicular to a rotation axis of the power roller, a roller-and-cage bearing assembly interleaved between the power-roller outer ring and the power-roller accommodating portion to permit a parallel translation of the power roller in an axial direction of the input and output disks, the roller-and-cage bearing assembly comprising a cage formed with a plurality of roller holes, and a plurality of rollers mounted in the plurality of roller holes, the cage having a portion defining a slotted hole, a protruded portion attached to the power-roller accommodating portion so that the protruded portion extends from the power-roller accommodating portion toward the cage in a direction of the rotation axis of the power roller, the slotted hole and the protruded portion being loosely fitted to each other to define a predetermined clearance that limits a displacement of the roller-and-cage bearing assembly in a direction perpendicular to both the rotation axis of the power roller and the trunnion axis to a set displacement.

According to another aspect of the invention, a toroidal continuously variable transmission includes input and output disks coaxially arranged and opposed to each other, a power roller interposed between the input and output disks under axial preload; the power roller comprising a power-roller inner ring kept in contact with the input and output disks, a power-roller outer ring receiving a contact pressure transferred from the input and output disks to the power-roller inner ring under the axial preload, and a power-roller bearing interleaved between the power-roller inner and outer rings, a power-roller support comprising a trunnion having a power-roller accommodating portion that supports the power roller to permit a tilting motion of the power roller about a trunnion axis perpendicular to a rotation axis of the power roller, the power-roller accommodating portion comprising a power-roller support base surface, a pair of upper and lower inner wall surfaces, and a pair of sloped surfaces each interconnecting the power-roller support base surface and either of the upper and lower inner wall surfaces, a roller-and-cage bearing assembly interleaved between the power-roller outer ring and the power-roller accommodating portion to permit a parallel translation of the power roller in an axial direction of the input and output disks, the roller-and-cage bearing assembly comprising a cage formed with a first group of roller holes that is closely juxtaposed to each other in a direction perpendicular to both the rotation axis of the power roller and the trunnion axis and facing a first sloped surface of the pair of sloped surfaces and a second group of roller holes that is closely juxtaposed to each other in a direction perpendicular to both the rotation axis of the power roller and the trunnion axis and facing a second sloped surface of the pair of sloped surfaces, and a first group of rollers mounted in the first group of roller holes and a second group of rollers mounted in the second group of roller holes to receive both a force component acting on the power roller in a direction of the rotation axis of the power roller and a force component transmitted from each of the input and output disks to the power roller and acting in a direction of the trunnion axis, the cage having a portion defining a slotted hole, a protruded portion attached to the power-roller support base surface of the power-roller accommodating portion so that the protruded portion extends from the power-roller support base surface toward the cage in the direction of the rotation axis of the power roller, the slotted hole and the protruded portion being loosely fitted to each other to define a predetermined clearance that limits a displacement of the roller-and-cage bearing assembly in the direction perpendicular to both the rotation axis of the power roller and the trunnion axis to a set displacement, while defining a less clearance along the trunnion axis.

The toroidal continuously variable transmission may further comprise a first lubricating oil supply port formed in the power-roller support base surface, a second lubricating oil supply port formed in a back face of the power-roller outer ring, a lubricating oil supply pipe intercommunicating the first and second lubricating oil supply ports, a disk-shaped member mounted on the lubricating oil supply pipe to prevent lubricating oil leakage, and an escape hole formed in the cage for escaping and protruding the disk-shaped member toward the back face of the power-roller outer ring, and wherein the predetermined clearance is a clearance defined between the disk-shaped member and the escape hole in the direction perpendicular to both the rotation axis of the power roller and the trunnion axis.

The other features of this invention will become understood from the following description with reference to the accompanying drawings.

DESCRIPTION OF THE PREFERRED EMBODIMENTS

Figure 1:
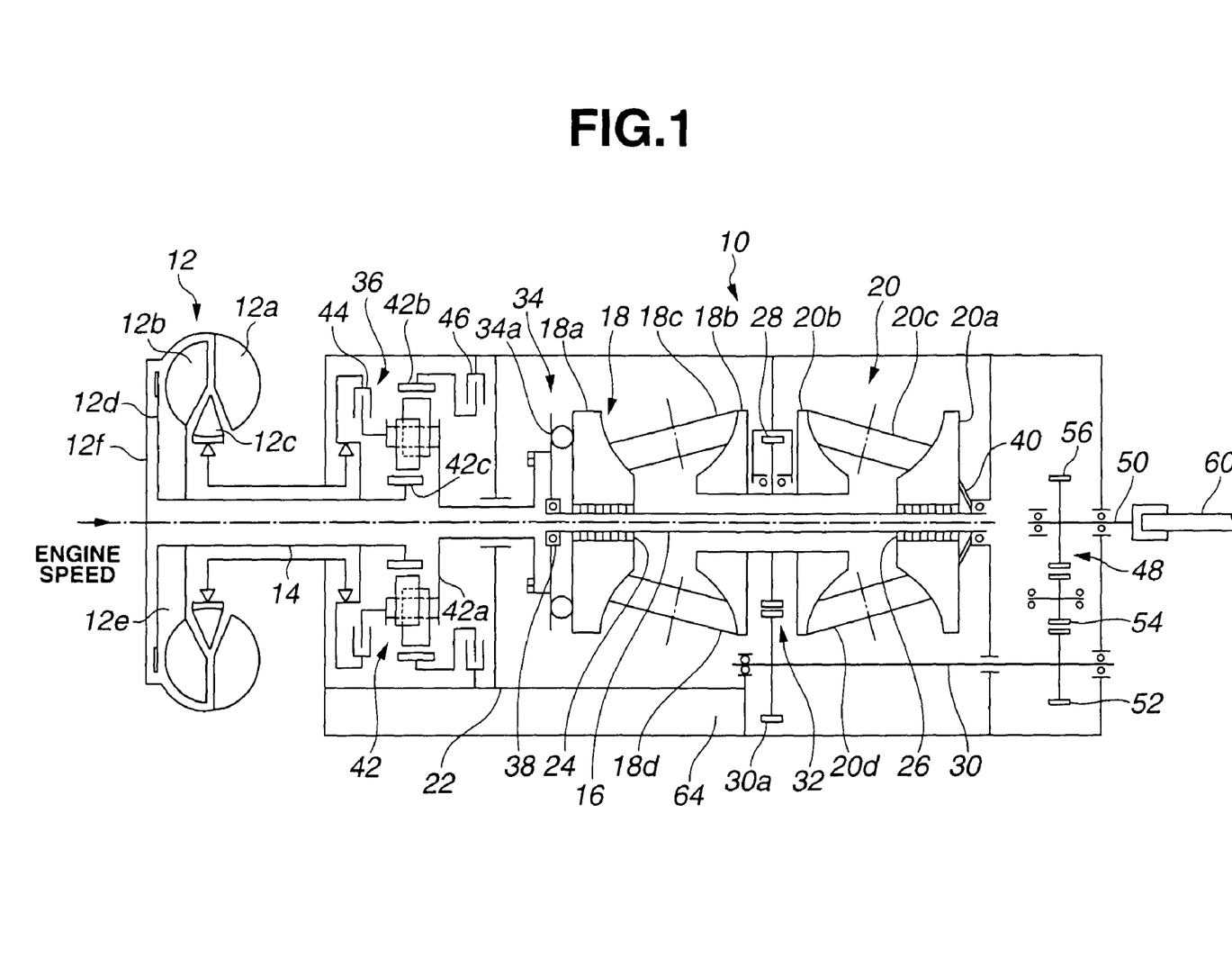
FIG. 1 is a system diagram illustrating an embodiment of a toroidal continuously variable transmission.

Referring now to the drawings, particularly to FIG. 1, a toroidal continuously variable transmission 10 of the embodiment is combined with a lock-up torque converter 12. As seen from the left-hand side of FIG. 1, engine torque (driving torque) is transmitted via lock-up torque converter 12 to an input shaft 14 of toroidal CVT 10. Lock-up torque converter 12 is comprised of a pump impeller 12a, a turbine runner 12b, a stator 12c, a lock-up clutch 12d, an apply-pressure chamber 12e, a release-pressure chamber 12f, and the like. Transmission input shaft 14 is rotatably located at the center of lock-up torque converter 12d. Input shaft 14 is connected to a forward and reverse changeover mechanism 36. Forward and reverse changeover mechanism 36 is comprised of a planetary gearset 42, a forward clutch 44, and a reverse brake 46. Planetary gearset 42 consists of a pinion carrier 42a with two planet pinions, a ring gear 42b being in meshed-engagement with these planet pinions, and a sun gear 42c. Pinion carrier 42a is connected to a torque-transmission shaft 16. A first toroidal CVT mechanism (or a first variator unit) 18 and a second toroidal CVT mechanism (or a second variator unit) 20 are set in tandem and arranged in the interior space of a transmission casing 22. Such an arrangement of the two variators is often called as a "dual cavity type toroidal CVT". A valve body of a CVT control system is laid out within a base denoted by reference sign 64. First and second toroidal CVT mechanisms 18 and 20 have the same construction. First toroidal CVT mechanism 18 is comprised of a pair of input and output disks 18a and 18b coaxially arranged and opposing each other, a pair of power rollers 18c and 18d, a power roller support or a trunnion (described later in reference to FIG. 2), and a servo piston serving as a hydraulic actuator (described later in reference to FIG. 2). Each of input and output disks 18a and 18b has a torus surface. Power rollers 18c and 18d are interposed between input and output disks 18a and 18b such that power rollers 18c and 18d are in contact with the torus surfaces of the input and output disks under axial preload. Power rollers 18c and 18d are symmetrically arranged to each other with respect to torque transmission shaft 16.

Similarly to the first toroidal CVT mechanism 18, the second toroidal CVT mechanism 20 is comprised of a pair of axially opposing input and output disks 20a and 20b, a pair of power rollers 20c and 20d, a power roller support or a trunnion (described later in reference to FIG. 2), and a servo piston serving as a hydraulic actuator (described later in reference to FIG. 2). First and second CVT mechanisms 18 and 20 are arranged in reverse to each other on torque transmission shaft 16 such that output disk 18b included in first toroidal CVT mechanism 18 and output disk 20b included in second toroidal CVT mechanism 20 are opposed to each other with respect to an output gear 28. Of input disks 18a and 20a, input disk 18a of first toroidal CVT mechanism 18 is preloaded axially rightwards (viewing FIG. 1) by means of a loading cam device 34. Loading cam device 34 is designed to produce a magnitude of the axial preload substantially proportional to input torque transmitted from lock-up torque converter 12 to input shaft 14. Loading cam device 34 has a slide bearing 38, and a loading cam 34a supported on torque transmission shaft 16 via slide bearing 38. On the other hand, input disk 20a of second toroidal CVT mechanism 20 is permanently biased axially leftwards (viewing FIG. 1) by means of a coned disc spring 40. Each of input disks 18a and 20a is supported on torque transmission shaft 16 by way of ball-spline-engagement (ball splines 24 and 26), so as to permit each of input disks 18a and 20a to axially move relative to the torque transmission shaft, and to rotate about the torque transmission shaft.

During ratio changing, each of power rollers 18c, 18d, 20c, and 20d is tilted or inclined so that the magnitude of a gyration angle based on a desired transmission ratio is attain. In accordance with a continuous change in the gyration angle, driving torque is transmitted to each of output disks 18b and 20b while steplessly varying an input speed of each of input disks 18a and 20a. Output disks 18b and 20b are connected to output gear 28 by way of spline-engagement. In contrast to input disks 18a and 20a, each of output disks 18b and 20b is axially stationary. Output gear 28 is fitted to torque transmission shaft 16 so that the output gear is rotatable relative to the torque transmission shaft. The driving torque is further transmitted from the output disks through output gear 28 to a gear 30a fixedly connected to a countershaft 30. Output gear 28 and gear 30a form a first torque transmission mechanism 32. The driving torque transmitted to countershaft 30 is further transmitted from a gear 52 through an idler gear 54 and a gear 56 to a transmission output shaft 50 coupled to a propeller shaft 60. Gear 52 is fixedly connected to countershaft 30, while gear 56 is fixedly connected to output shaft 50. Idler gear 54 is in meshed-engagement with both the gears 52 and 56. Gears 52, 56, and idler gear 54 construct a second torque transmission mechanism 48.

Figure 2:
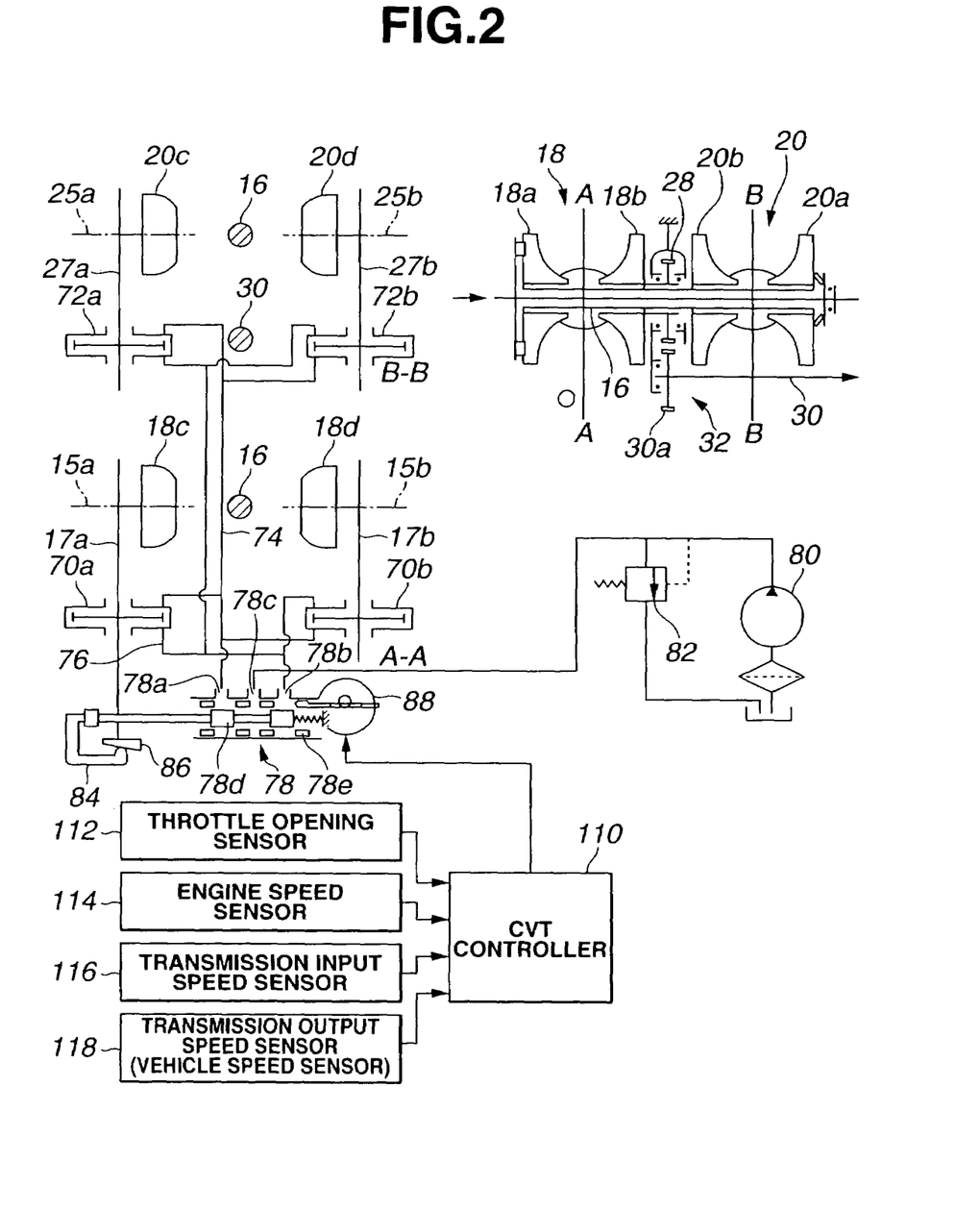
FIG. 2 is a system block diagram illustrating a CVT control system for the toroidal CVT of the embodiment.

Referring now to FIG. 2, there is shown the system block diagram of the CVT control system used to tilt each of power rollers 18c, 18d, 20c, and 20d in order to obtain a gyration angle corresponding to a transmission ratio. As shown in FIG. 2, each of power rollers 18c, 18d, 20c, and 20d is supported on one end of each of trunnions 17a, 17b, 27a, and 27b. Power rollers 18c, 18d, 20c, and 20d are rotatable about the respective power-roller rotation axes 15a, 15b, 25a, and 25b. As described later, the four power rollers are supported by the respective trunnions 17a, 17b, 27a, 27b, in such a manner as to permit parallel translation of each of the power rollers in the right-and-left direction (also referred to as being in the horizontal direction or in the axial direction of the input and output disks) relative to the associated trunnion. More precisely, the right-and-left direction is defined as a direction perpendicular to both the rotation axis of the power roller and a trunnion axis (described later).

Each of servo pistons 70a, 70b, 72a, and 72b is provided on the other end of each of trunnions 17a, 17b, 27a, and 27b, so as to tilt each of the power rollers by shifting trunnions 17a and 17b of first toroidal CVT mechanism 18 in opposite directions of their trunnion axes perpendicular to the power-roller rotation axes and by shifting trunnions 27a and 27b of second toroidal CVT mechanism 20 in opposite directions of their trunnion axes perpendicular to the power-roller rotation axes. The hydraulic control system that controls the respective servo pistons 70a, 70b, 72a, and 72b, includes a high-pressure oil passage 74 communicating a high-pressure chamber, a low-pressure oil passage 76 communicating a low-pressure chamber, and a ratio change control valve 78 having a port 78a connected to high-pressure oil passage 74, a port 78b connected to low-pressure oil passage 76, a line-pressure port 78c, and a ratio change control spool 78d. Line pressure is produced by a hydraulic pressure source containing an oil pump 80 and a pressure relief valve 82. The line pressure is supplied into line-pressure port 78c of ratio change control valve 78. Ratio change control spool 78d is mechanically linked via a lever 84 to a precision cam 86.

The precision cam 86 serves to detect a vertical displacement of trunnion 17a along its trunnion rod (trunnion axis) and a tilting motion of trunnion 17a (or a gyration angle of power roller 18c), for feeding a change in the vertical displacement of trunnion 17a and a change in the tilting motion of trunnion 17a back to the ratio change control valve. A ratio change control sleeve 78e is also provided in ratio change control valve 78. Ratio change control sleeve 78e can be moved axially by means of a stepping motor 88 whose angular steps are electromagnetically controlled by a CVT controller 110.

The CVT controller 110 generally comprises a microcomputer. The CVT controller includes an input/output interface (I/O), memories (RAM, ROM), and a microprocessor or a central processing unit (CPU). The input/output interface (I/O) of CVT controller 110 receives input information from various engine/vehicle sensors, namely a throttle opening sensor 112, an engine speed sensor 114, a transmission input shaft speed sensor (simply, a transmission input speed sensor) 116, and a transmission output shaft speed sensor (simply, a transmission output speed sensor) 118. A vehicle speed sensor is often used as the transmission output speed sensor. Within CVT controller 110, the central processing unit (CPU) allows the access by the I/O interface of input informational data signals from the previously-discussed engine/vehicle sensors 112, 114, 116, and 118. The CPU of CVT controller 110 is responsible for carrying the stepping motor control program stored in memories and is capable of performing necessary arithmetic and logic operations containing a toroidal-CVT ratio control management processing (not shown). Computational results (arithmetic calculation results), that is, a calculated output signal is relayed via the output interface circuitry of the CVT controller to the stepping motor.

Supports of four power rollers 18c, 18d, 20c, and 20d are the same. Therefore, only the support structure of power roller 18c is hereunder described in detail in reference to FIG. 3.

Figure 3:
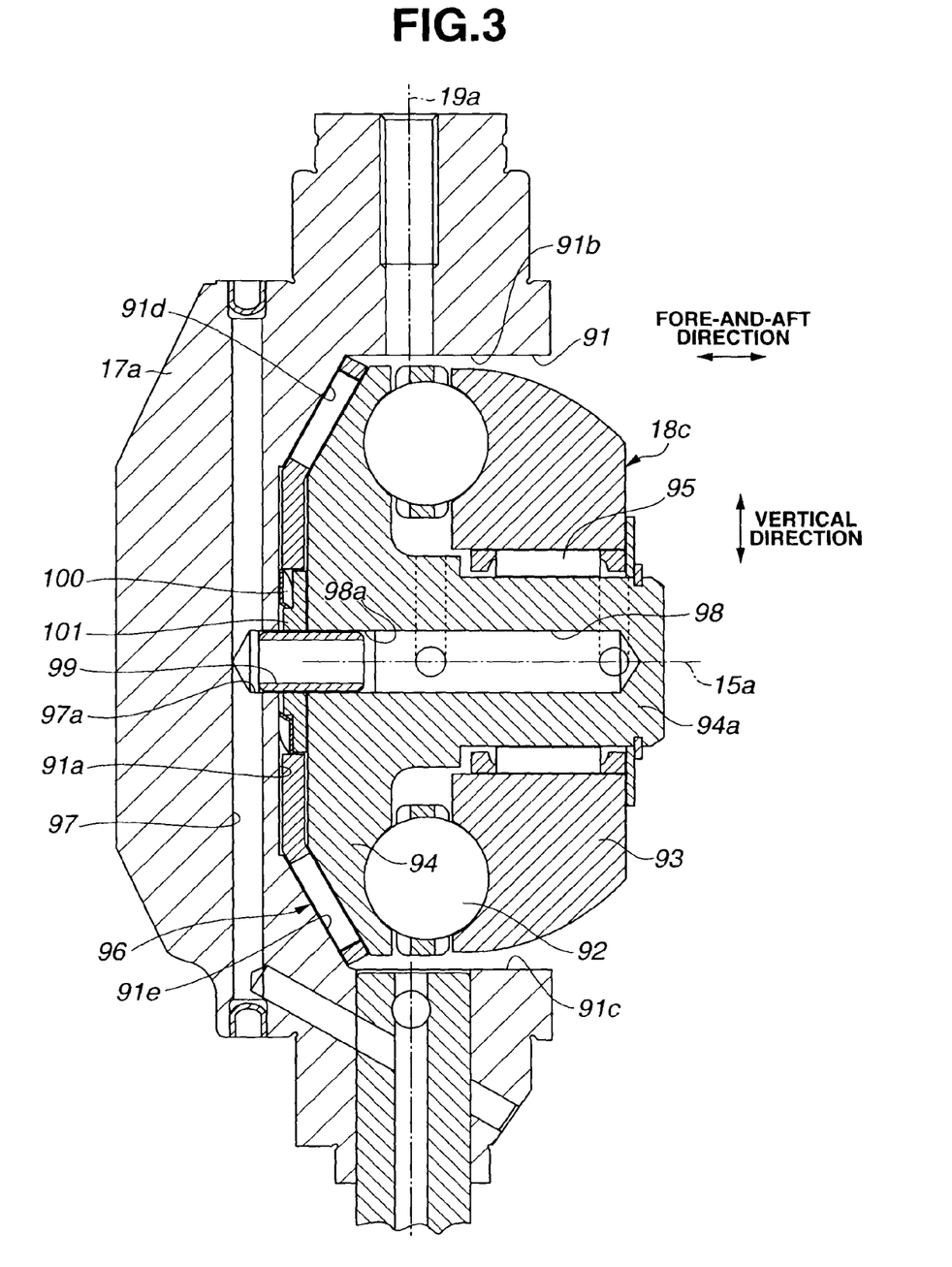
FIG. 3 is a cross-sectional view illustrating a power-roller support of the toroidal CVT of the embodiment.

Trunnion 17a is formed at its one end with a recessed power-roller accommodating portion 91. Power-roller accommodating portion 91 has a substantially C shape in cross section. As can be seen in FIG. 3, power-roller accommodating portion 91 is formed with a flat power-roller support base surface 91a, a pair of vertically opposing upper and lower flat inner wall surfaces 91b and 91c, an upper sloped surface 91d interconnecting support base surface 91a and upper flat inner wall surface 91b, and a lower sloped surface 91e interconnecting support base surface 91a and lower flat inner wall surface 91c. Power roller 18c is accommodated in the power-roller accommodating portion 91 and supported by trunnion 17a in such a manner as to permit parallel translation of power roller 18c in the right-and-left direction (in the horizontal direction). Trunnion 17a is provided to tilt or incline about its trunnion axis (an axis of tilting motion) 19a perpendicular to the rotation axis 15a of power roller 18c, supporting power roller 18c. Power roller 18c is comprised of a power-roller ball bearing 92, a power-roller inner ring 93, a power-roller outer ring 94, and a roller bearing 95. Power-roller inner ring 93 is kept in contact with input and output disks 18a and 18b. Power-roller outer ring 94 has a central shaft portion 94a on which power-roller inner ring 93 is rotatably supported via roller bearing 95. Power-roller outer ring 94 is supported on the previously-discussed power-roller support base surface 91a so that the rotation axis of the power roller is perpendicular to a flat plane of power-roller support base surface 91a. Power-roller ball bearing 92 is interleaved between power-roller inner and outer rings 93 and 94. Under axial preload produced by loading cam device 34, a contact pressure transferred from input and output disks 18a and 18b to power-roller inner ring 93 is received by power-roller outer ring 94 through power-roller ball bearing 92.

A roller-and-cage bearing assembly 96 is interposed between power-roller outer ring 94 and power-roller accommodating portion 91 of trunnion 17a, for supporting power roller 18c, while permitting the parallel translation of power roller 18c in the axial direction of input and output disks 18a and 18b. Upper and lower roller bearing portions of roller-and-cage bearing assembly 96 are located on the respective sloped surfaces 91d and 91e. The upper and lower roller bearing portions, located on the respective sloped surfaces 91d and 91e, receive a force component acting on power roller 18c in a direction of power-roller rotation axis 15a (or in the fore-and-aft direction in FIG. 3), and a force component transmitted from each of input and output disks 18a and 18b to power roller 18c and acting in a direction of trunnion axis 19a (in the vertical direction in FIG. 3). To more effectively receive these force components, the upper and lower roller bearing portions of the roller-and-cage bearing assembly are symmetrical with respect to the rotation axis of the power roller.

The toroidal CVT is equipped with a lubricating system generally composed of a trunnion lubrication system mainly used for lubrication of joints, ball and roller bearings and for lubrication and cooling of the power rollers and the input and output disks, and a rolling contact surface lubrication system used for lubrication of rolling contact surfaces between the power roller and input and output disks. Of these lubrication systems, a former lubrication system is hereunder described in detail in reference to FIG. 3. Trunnion 17a is formed with a trunnion lubricating oil passage 97. Some of pressure oil discharged from a hydraulic pump (not shown) passes through an oil cooler (not shown) and then the properly-cooled traction oil (called "continuously variable transmission fluid" abbreviated to "CVTF") is supplied to trunnion lubricating oil passage 97 for lubricating and cooling the power roller and trunnion. After lubrication, almost all of the traction oil drains back into an oil reservoir (not shown). Power-roller outer ring 94 is formed with a power-roller outer ring lubricating oil passage 98 for delivering lubricating oil (traction oil) from trunnion lubricating oil passage 97 through power-roller outer ring lubricating oil passage 98 to both ball bearing 92 and roller bearing 95. A lubricating oil supply port 97a is formed in power-roller support base surface 91a, whereas a lubricating oil supply inlet 98a is formed in the back face of power-roller outer ring 94. One end of a lubricating oil supply pipe 99 is fixedly connected to lubricating oil supply port 97a, while the other end of lubricating oil supply pipe 99 is fitted into lubricating oil supply inlet 98a, so as to intercommunicate the two lubricating oil supply ports 97a and 98a. To prevent oil leakage, an axially-protruded, disk-shaped member 101 and an elastic member (or a restricting member) 100 are attached onto or provided on the outer periphery of lubricating oil supply pipe 99, so that disk-shaped member 101 is permanently forced toward the back face of power-roller outer ring 94 by restricting member 100, for good sealing.

Figure 4A:
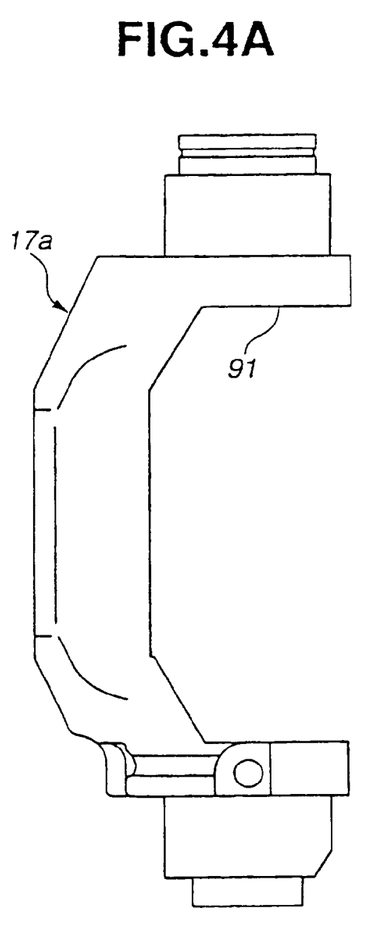
FIGS. 4A and 4B respectively show a side view and a front elevation view of the power-roller support equipped with a horizontal-displacement limiting structure for a roller-and-cage bearing assembly as viewed from the axial direction of input and output disks.
Figure 4B:
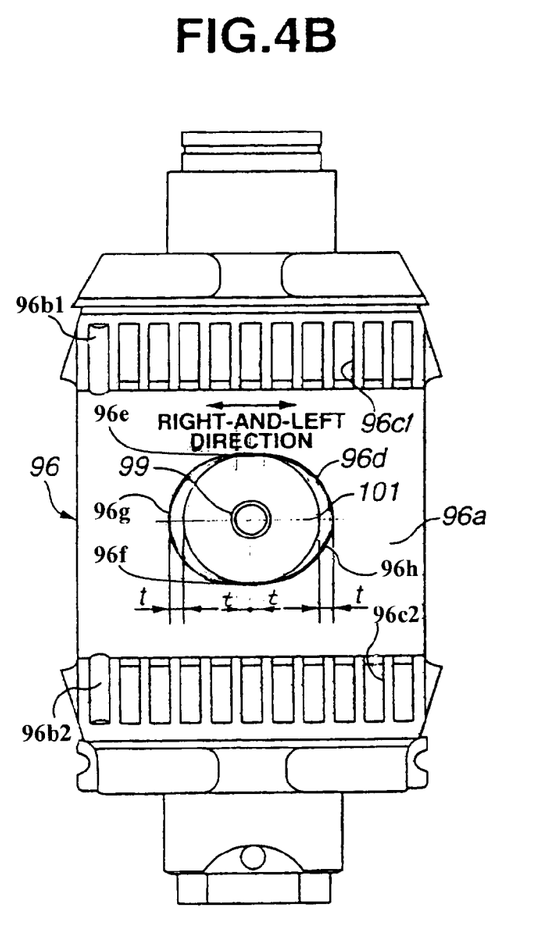

The horizontal-displacement limiting structure for roller-and-cage bearing assembly 96 attached to the power-roller support of the toroidal CVT of the embodiment is hereunder described in detail in reference to FIGS. 4A and 4B.

As seen in FIGS. 4A and 4B, roller-and-cage bearing assembly 96 is comprised of a cage 96a and a plurality of rollers 96b1 (in a first group) and 96b2 (in a second group). Cage 96a is formed with a first group of roller holes 96c1 (a plurality of upper roller holes) closely juxtaposed and parallel to each other in the right-and-left direction (in the horizontal direction), and a second group of roller holes 96c2 (a plurality of lower roller holes) closely juxtaposed and parallel to each other in the right-and-left direction. First group of roller holes 96c1 face the sloped surface 91d, while second group of roller holes 96c2 face the sloped surface 91e. Rollers 96b1 and 96b2 are mounted in the respective roller-hole groups 96c1 and 96c2, so that the rollers 96b1 and 96b2 are rotatable about their axes.

The horizontal-displacement limiting structure for roller-and-cage bearing assembly 96 is formed by a substantially central, oval slotted hole 96d formed in cage 96a of roller-and-cage bearing assembly 96 and the aforesaid disk-shaped member 101 coaxially arranged on lubricating oil supply pipe 99 and loosely fitted into oval slotted hole 96d. The substantially central, oval slotted hole 96d serves as an escape hole through which the disk-shaped member 101 axially escapes or protrudes toward the back face of power-roller outer ring 94. A major axis of oval slotted hole 96d extends in the right-and-left direction, while a minor axis of oval slotted hole 96d extends in the vertical direction (see FIG. 4B). Furthermore, as can be seen in FIG. 4B, the oval slotted hole 96d has a flat portion 96e at the top and an equal flat portion 96f at the bottom while the left side portion 96g and the right side portion 96h of the oval slotted hole 96d each have the shape of opposing elliptical portions.

More specifically, while loosely fitting disk-shaped member 101 into the oval slotted hole 96d, a predetermined clearance (t, t) therebetween is determined in the right-and-left direction. The predetermined clearance (t, t) is defined in a direction of a major axis of the oval slotted hole 96d or in the right-and-left direction shown in FIG. 4B. In contrast, there is lesser clearance in the vertical direction (or the direction that is perpendicular to the right-and-left direction in FIG. 4B). The predetermined clearance (t, t) corresponds to a horizontal clearance that acts to restrict or limit the horizontal displacement (i.e., a displacement of roller-and-cage assembly 96 relative to trunnion 17a in the right-and-left direction) to a maximum allowable set displacement. The actual values of the predetermined clearance (t, t) is determined using design considerations that are well within the abilities of those skilled in the art. For example, in one embodiment, the value of the "t" is selected such that the end rollers of the roller-and-cage assembly (for example, either 96b1 or 96b2) do not protrude out and contact the trunnion (for example, trunnion 17a) when the cage 96a is at its extreme right or left position. In this way, the edge rollers (for example, 96b1 or 96b2) do not contact the trunnion when the cage 96a is at its extreme right or left position and the rollers are not scratched or damaged by the trunnion or vice versa. Also, as shown in FIG. 4B, in one embodiment, each of the flat portions 96e and 96f also have the same dimensions (t, t) corresponding to the predetermined clearances (t, t) on the right and left side between the oval slotted hole 96d and the disk-shaped member 101. In one embodiment, the flat portions (t, t) are arranged to be symmetrical about the trunnion axis in the right-and-left direction.

The toroidal CVT of the embodiment having the power-roller support equipped with the horizontal-displacement limiting structure for roller-and-cage bearing assembly 96 operates as follows.

Ratio-Changing Control

Power rollers 18c, 18d, 20c, and 20d are tilted by slightly shifting trunnions 17a, 17b, 27a, and 27b in the respective directions of trunnion axes (a direction of trunnion axis 19a in case of trunnion 17a) so as to change the transmission ratio.

More specifically, as soon as an axial displacement of ratio change control sleeve occurs by rotating stepping motor 88 in response to a command signal corresponding to the desired transmission ratio and generated from CVT controller 90, working fluid is supplied into a first servo-piston chamber of each of servo pistons 70a, 70b, 72a, and 72b. At the same time, working fluid is exhausted from a second servo-piston chamber of each of the servo pistons. As a result of this, each of trunnions 17a, 17b, 27a, and 27b is slightly shifted in the direction of its trunnion axis. Thus, the center of rotation of each of power rollers 18c, 18d, 20c, and 20d is vertically offset from the center of rotation of the disks. By virtue of a side-slip force occurring in a very limited contact zone between each of power rollers 18c, 18d, 20c, and 20d and the associated input and output disks owing to the slight vertical offset (the vertical displacement), power rollers 18c, 18d, 20c, and 20d are tilted. The tilting motion (a gyration angle or tilt angle of each power roller) of trunnion 17a and the vertical offset (vertical displacement) of trunnion 17a are mechanically transmitted via precision cam 86 and lever 84 to ratio change control spool 78d. By way of feedback action of precision cam 86 and lever 84, ratio change control spool 78d is held at a balanced position with respect to ratio change control sleeve 78e driven by stepping motor 88. In this manner, as soon as the predetermined gyration angle corresponding to the desired transmission ratio has been reached, the vertical displacement of each of the trunnions is returned to zero, in other words, the power-roller rotation axis of each of power rollers 18c, 18d, 20c, and 20d is leveled with respect to the center of rotation of the disks, so as to stop the tilting motion of each of the power rollers. As discussed above, the transmission ratio is determined depending on the gyration angle of each of power rollers 18c, 18d, 20c, and 20d.

Load Supporting and Sliding Action of Power Roller

Hereunder described in detail is the load supporting and sliding action of power roller 18c selected as a representative. This is because the four power rollers exhibit the same load supporting and sliding action.

During power transmission, a contact pressure transferred from input and output disks 18a and 18b to power-roller inner ring 93 of power roller 18c under axial preload is received by power-roller outer ring 94 through power-roller ball bearing 92. During power transmission, a force component acting on power roller 18c in the direction of power-roller rotation axis 15a and a force component transmitted from each of input and output disks 18a and 18b to power roller 18c and acting in the direction of trunnion axis 19a are both received by means of roller-and-cage bearing assembly 96 interposed between power-roller outer ring 94 and power-roller accommodating portion 91. Therefore, during application of the force component transmitted from each of input and output disks 18a and 18b to power roller 18c and acting in the direction of trunnion axis 19a, that is, the vertical direction, the vertical force component is reliably received by roller-and-cage bearing assembly 96. At this time, assuming that a horizontal force component acts on power roller 18c, roller-and-cage bearing assembly 96 carries or moves power roller 18c in the right-and-left direction (in the horizontal direction) by way of a low rolling resistance, with the rollers rolling. That is, the upper and lower roller bearing portions of roller-and-cage bearing assembly 96 located on the respective sloped surfaces 91d and 91e act to permit smooth parallel translation of power roller 18c in the right-and-left direction (in the horizontal direction), while certainly effectively receiving the vertical force component acting on the power roller during power transmission. Even in the presence of a slight error in relative position between the power roller and the respective disk owing to deformation of the input and output disks during power transmission, or in presence of a slight misalignment after installation, the slight error can be effectively absorbed by way of smooth parallel translation of power roller 18c relative to trunnion 17a. Due to the smooth parallel translation, it is possible to accurately uniformly balance a pushing force transmitted from input disk 18a to power roller 18c and a pushing force transmitted from output disk 18b to power roller 18c. Thus, it is possible to avoid an unbalance between the pushing force transmitted from input disk 18a to power roller 18c and the pushing force transmitted from output disk 18b to power roller 18c, thereby suppressing or preventing an undesired slippage from occurring in the very limited contact zone between power roller 18c and each of input and output disks 18a and 18b. Furthermore, the power-roller support structure of the toroidal CVT of the embodiment eliminates the necessity of a fit hole for a conventional eccentric pivot shaft structure used to support a power roller. As a consequence, it is possible to avoid stress concentration around the fit hole, thereby ensuring the increased mechanical strength and rigidity of the trunnion and thus suppressing undesired deformation of the trunnion. For the reasons discussed above, there is less deviation of an actual contact point between power roller 18c and each of input and output disks 18a and 18b from a design contact point. This prevents a bearing stress from increasing owing to unbalanced load, and reduces an unintended ratio change, which may occur due to deformation of the input and output disks or deformation of the trunnion.

Position Limiting Action for Roller-and-Cage Bearing Assembly

Hereinafter described in detail is the position limiting action for roller-and-cage bearing assembly 96 in the support structure of power roller 18c (selected as a representative) on trunnion 17a.

During ratio changing, to keep power roller 18c permanently in contact with input and output disks 18a and 18b irrespective of tilting motion of power roller 18c, the input disk is forced toward the output disk by way of axial preload produced by loading cam device 34. At this time, only the input disk 18a is biased and shifted toward output disk 18b by means of loading cam device 34. On the other hand, trunnion axis 19a of trunnion 17a is a fixed axis, which is not moveable in the axial direction of input and output disks 18a and 18b. Therefore, in order to keeping power roller 18c in contact with input and output disks 18a and 18b by means of loading cam device 34, while following slight changes in relative distance between input and output disks 18a and 18b, power roller 18c is supported in a manner so as to permit parallel translation of the power roller 18c itself in the axial direction of input and output disks 18a and 18b. Additionally, even when there is a slight error in relative position between the power roller and the respective disk, occurring owing to deformation of input and output disks 18a and 18b during power transmission or in presence of a slight misalignment after installation, roller-and-cage bearing assembly 96 serves to permit the parallel translation of power roller 18c in the right-and-left direction to effectively absorb or compensate for the slight error. Assuming that the parallel translation of power roller 18c repeatedly takes place owing to the previously-noted factors, there is an increased tendency for roller-and-cage bearing assembly 96 to be protruded out of power-roller accommodating portion 91 of trunnion 17a. This is because a horizontal displacement of cage 96a obtained by pushing cage 96a by power roller 18c is somewhat different from that obtained when an external force applied to power roller 18c is released. However, according to the power-roller support structure of the toroidal CVT of the embodiment, the predetermined clearance (t, t) is defined between oval slotted hole 96d formed in cage 96a of roller-and-cage bearing assembly 96 and disk-shaped member 101 mounted on lubricating oil supply pipe 99, such that the horizontal displacement of roller-and-cage bearing assembly 96 relative to trunnion 17a is limited to the maximum allowable set displacement, which is determined by the size of predetermined clearance (t, t). Therefore, the horizontal-displacement limiting structure of the toroidal CVT of the embodiment can reliably prevent roller-and-cage bearing assembly 96 from being protruded out of power-roller accommodating portion 91 of trunnion 17a or prevent roller-and-cage bearing assembly 96 from falling out of trunnion 17a. In other words, it is possible to maintain roller-and-cage bearing assembly 96 in a positional range within which the roller-and-cage bearing assembly can provide adequate support for power roller 18c.

In addition, the disk-shaped member 101, which axially slightly protrudes from flat power-roller support base surface 91a of power-roller accommodating portion 91 of trunnion 17a toward the back face of power roller 18c and is loosely fitted to substantially central, oval slotted hole 96d formed in cage 96a, is used as a part of the horizontal-displacement limiting structure of the toroidal CVT of the embodiment. The disk-shaped member 101 is usually used as a sealing member in the trunnion power-roller support structure. Thus, in the horizontal-displacement limiting structure of the toroidal CVT of the embodiment, it is unnecessary to separately provide a stopper (a protruded stopper) on flat power-roller support base surface 91a of power-roller accommodating portion 91. Furthermore, the oval slotted hole 96d engaged with disk-shaped member 101 can be easily produced by horizontally enlarging a fit hole (usually formed as a circle) for disk-shaped member 101, taking into account the predetermined clearance (t, t), i.e., the maximum allowable set displacement of roller-and-cage bearing assembly 96 relative to trunnion 17a. Such machining is very easy, thus reducing man-hour and manufacturing costs.

The entire contents of Japanese Patent Application No. P2001-035535 (filed Feb. 13, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A toroidal continuously variable transmission comprising:
   input and output disks coaxially arranged and opposing each other;
   a power roller interposed between the input and output disks under axial preload, the power roller comprising a power-roller inner ring kept in contact with the input and output disks, a power-roller outer ring receiving a contact pressure transferred from the input and output disks to the power-roller inner ring under the axial preload, and a power-roller bearing interleaved between the power-roller inner and outer rings;
   a power-roller support comprising a trunnion having a power-roller accommodating portion that supports the power roller to permit a tilting motion of the power roller about a trunnion axis perpendicular to a rotation axis of the power roller;
   a roller-and-cage bearing assembly interleaved between the power-roller outer ring and the power-roller accommodating portion to permit a parallel translation of the power roller in an axial direction of the input and output disks, the roller-and-cage bearing assembly comprising:
   (a) a cage formed with a plurality of roller holes, and
   (b) a plurality of rollers respectively mounted in the plurality of roller holes, the cage having a portion defining a slotted hole; and a protruded portion attached to the power-roller accommodating portion so that the protruded portion extends from the power-roller accommodating portion toward the cage in a direction of the rotation axis of the power roller;

wherein the slotted hole and the protruded portion are loosely fitted to each other to define a predetermined clearance between the slotted hole and the protruded portion, the predetermined clearance being determined to permit a set displacement of the roller-and-cage bearing assembly relative to the trunnion in a direction perpendicular to both the rotation axis of the power roller and the trunnion axis.

2. The toroidal continuously variable transmission as claimed in claim 1, wherein the power-roller support comprises a power-roller support base surface on which the power-roller outer ring is supported, and which further comprises:

(i) a first lubricating oil supply port formed in the power-roller support base surface;

(ii) a second lubricating oil supply port formed in a back face of the power-roller outer ring;

(iii) a lubricating oil supply pipe intercommunicating the first and second lubricating oil supply ports;

(iv) a disk-shaped member mounted on the lubricating oil supply pipe to prevent lubricating oil leakage; and (v) an escape hole formed in the cage for escaping and protruding the disk-shaped member toward the back face of the power-roller outer ring, wherein the predetermined clearance is a clearance defined between the disk-shaped member and the escape hole in a direction perpendicular to both the rotation axis of the power roller and the trunnion axis.

3. The toroidal continuously variable transmission as claimed in claim 2, wherein the escape hole comprises an oval slotted hole formed in the cage, and wherein the disk-shaped member is coaxially arranged on the lubricating oil supply pipe and loosely fitted into the oval slotted hole to limit the displacement of the roller-and-cage bearing assembly in the direction perpendicular to both the rotation axis of the power roller and the trunnion axis to the set displacement, while inhibiting a displacement of the roller-and-cage bearing assembly along the trunnion axis.

4. The toroidal continuously variable transmission as claimed in claim 1, wherein the slotted hole has an oval slope and comprises a flat portion.

5. The toroidal continuously variable transmission as claimed in claim 4, wherein the flat portion extends in a direction that is perpendicular to both the rotation axis of the power roller and the trunnion axis and wherein the dimension of the flat portion corresponds to the predetermined clearance.

6. A toroidal continuously variable transmission comprising:

input and output disks coaxially arranged and opposing each other;

a power roller interposed between the input and output disks under axial preload, the power roller comprising a power-roller inner ring kept in contact with the input and output disks, a power-roller outer ring receiving a contact pressure transferred from the input and output disks to the power-roller inner ring under the axial preload, and a power-roller bearing interleaved between the power-roller inner and outer rings;

a power-roller support comprising a trunnion having a power-roller accommodating portion that supports the power roller to permit a tilting motion of the power roller about a trunnion axis perpendicular to a rotation axis of the power roller, the power-roller accommodating portion comprising:

(a) a power-roller support base surface;

(b) a pair of upper and lower inner wall surfaces; and (c) a pair of sloped surfaces each interconnecting the power-roller support base surface and either of the upper and lower inner wall surfaces;

a roller-and-cage bearing assembly interleaved between the power-roller outer ring and the power-roller accommodating portion to permit a parallel translation of the power roller in an axial direction of the input and output disks, the roller-and-cage bearing assembly comprising:

(a) a cage formed with a first group of roller holes that is closely juxtaposed to each other in a direction perpendicular to both the rotation axis of the power roller and the trunnion axis and facing a first sloped surface of the pair of sloped surfaces and a second group of roller holes that is closely juxtaposed to each other in a direction perpendicular to both the rotation axis of the power roller and the trunnion axis and facing a second sloped surface of the pair of sloped surfaces; and (b) a first group of rollers mounted in the first group of roller holes and a second group of rollers mounted in the second group of roller holes to receive both a force component acting on the power roller in a direction of the rotation axis of the power roller and a force component transmitted from each of the input and output disks to the power roller and acting in a direction of the trunnion axis;

wherein the cage comprises a portion defining a slotted hole;

a protruded portion attached to the power-roller support base surface of the power-roller accommodating portion so that the protruded portion extends from the power-roller support base surface toward the cage in the direction of the rotation axis of the power roller;

wherein the slotted hole and the protruded portion are loosely fitted to each other to define a predetermined clearance between the slotted hole and the protruded portion, the predetermined portion being determined to permit a set displacement of the roller-and-cage bearing assembly in a direction perpendicular to both the rotation axis of the power roller and the trunnion axis, while defining a lesser clearance along a direction of the trunnion axis.

7. The toroidal continuously variable transmission as claimed in claim 6, further comprising:

(i) a first lubricating oil supply port formed in the power-roller support base surface;

(ii) a second lubricating oil supply port formed in a back face of the power-roller outer ring;

(iii) a lubricating oil supply pipe intercommunicating the first and second lubricating oil supply ports;

(iv) a disk-shaped member mounted on the lubricating oil supply pipe to prevent lubricating oil leakage; and (v) an escape hole formed in the cage for escaping and protruding the disk-shaped member toward the back face of the power-roller outer ring, wherein the predetermined clearance is a clearance defined between the disk-shaped member and the escape hole in the direction perpendicular to both the rotation axis of the power roller and the trunnion axis.

8. The toroidal continuously variable transmission as claimed in claim 7, wherein the escape hole comprises an oval slotted hole formed in the cage; and wherein the disk-shaped member is coaxially arranged on the lubricating oil supply pipe and loosely fitted into the oval slotted hole to limit the displacement of the roller-and-cage bearing assembly in the direction perpendicular to both the rotation axis of the power roller and the trunnion axis to the set displacement, while inhibiting a displacement of the roller-and-cage bearing assembly along the trunnion axis.

9. The toroidal continuously variable transmission as claimed in claim 6, wherein the first and second groups of rollers of the roller-and-cage bearing assembly are symmetrical with respect to the rotation axis of the power roller; and wherein the rotation axis of the power roller is perpendicular to a flat plane of the power-roller support base surface.

* * * * *